US011088357B2

(12) United States Patent
Jung et al.

(10) Patent No.: US 11,088,357 B2
(45) Date of Patent: Aug. 10, 2021

(54) BATTERY CASE, BATTERY, AND METHOD FOR FABRICATING A BATTERY

(71) Applicant: SAMSUNG ELECTRONICS CO., LTD., Suwon-si (KR)

(72) Inventors: Moon Il Jung, Suwon-si (KR); Song Won Hyun, Yongin-si (KR); In Kim, Suwon-si (KR); Moo Ho Lee, Suwon-si (KR); In Su Lee, Hwaseong-si (KR); Junghoon Lee, Seongnam-si (KR); Hye Jeong Lee, Suwon-si (KR); Ginam Kim, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/217,126

(22) Filed: Dec. 12, 2018

(65) Prior Publication Data
US 2019/0181393 A1 Jun. 13, 2019

(30) Foreign Application Priority Data
Dec. 12, 2017 (KR) .................. 10-2017-0170179

(51) Int. Cl.
*H01M 2/28* (2006.01)
*H01M 2/02* (2006.01)
(Continued)

(52) U.S. Cl.
CPC .......... *H01M 2/028* (2013.01); *H01M 2/024* (2013.01); *H01M 2/0237* (2013.01);
(Continued)

(58) Field of Classification Search
CPC .... H01M 2/028; H01M 2/0237; H01M 2/024; H01M 2/0295; H01M 2/043;
(Continued)

(56) References Cited

U.S. PATENT DOCUMENTS

| 4,719,159 A | | 1/1988 | Clark et al. | |
| 5,527,641 A | * | 6/1996 | Koshiishi | ................. C09D 5/24 428/469 |

(Continued)

FOREIGN PATENT DOCUMENTS

| JP | 10139998 A | 5/1998 |
| JP | H11191400 A | 7/1999 |

(Continued)

OTHER PUBLICATIONS

Gyeong-Jin Ahn, KR1020100071634 Translated, May 2012, K-Pion (Year: 2012).*

(Continued)

*Primary Examiner* — Jimmy Vo
(74) *Attorney, Agent, or Firm* — Cantor Colburn LLP

(57) ABSTRACT

A battery case including: a container configured to house an electrode assembly, wherein the container includes a bottom wall and a plurality of side walls, the bottom wall and the plurality of side walls are integrated to define a space for housing the electrode assembly and to provide a top opening opposite the bottom wall, the container includes a polymeric composition including a polymer and an inorganic moisture absorbent dispersed in the polymer, and the battery case has a water vapor transmission rate (WVTR) of less than about 0.05 grams per square meter per day, when measured at 38° C. and a relative humidity of 100% according to ISO 15106 or ASTM F1249.

18 Claims, 4 Drawing Sheets

(51) Int. Cl.
*H01M 10/058* (2010.01)
*H01M 2/06* (2006.01)
*H01M 2/04* (2006.01)
*H01M 10/0525* (2010.01)
*H01M 10/52* (2006.01)

(52) U.S. Cl.
CPC ......... *H01M 2/0295* (2013.01); *H01M 2/043* (2013.01); *H01M 2/0482* (2013.01); *H01M 2/06* (2013.01); *H01M 10/058* (2013.01); *H01M 10/0525* (2013.01); *H01M 10/52* (2013.01); *H01M 2220/20* (2013.01)

(58) Field of Classification Search
CPC .. H01M 2/0482; H01M 2/06; H01M 10/0525; H01M 10/058; H01M 10/52; H01M 50/116; H01M 50/24; H01M 50/20; H01M 50/155; H01M 50/166
See application file for complete search history.

(56) References Cited

U.S. PATENT DOCUMENTS

| | | | |
|---|---|---|---|
| 6,451,474 B1 | 9/2002 | Kozu et al. | |
| 7,294,431 B2 | 11/2007 | Puttaiah et al. | |
| 7,300,500 B2 | 11/2007 | Okada et al. | |
| 7,744,778 B2 | 6/2010 | Lee et al. | |
| 7,901,991 B2 | 3/2011 | Bonucci et al. | |
| 8,304,473 B2 | 11/2012 | Yang et al. | |
| 8,460,808 B2 | 6/2013 | Toia et al. | |
| 8,461,662 B2 | 6/2013 | Lee et al. | |
| 8,524,115 B2 | 9/2013 | Solovyov et al. | |
| 8,828,591 B2 | 9/2014 | Hatta et al. | |
| 8,853,124 B2 | 10/2014 | Incorvia et al. | |
| 9,343,717 B2 | 5/2016 | Gless et al. | |
| 9,419,315 B2 | 8/2016 | Tyler et al. | |
| 9,595,626 B2 | 3/2017 | Bonucci et al. | |
| 10,449,521 B2 | 10/2019 | Cho et al. | |
| 2005/0233206 A1* | 10/2005 | Puttaiah | H01M 2/0262 429/120 |
| 2013/0209878 A1* | 8/2013 | Nakahara | H01M 10/0525 429/211 |
| 2013/0323573 A1 | 12/2013 | Tanaka | |
| 2014/0342204 A1 | 11/2014 | Hatta et al. | |
| 2015/0372263 A1* | 12/2015 | Douke | B32B 15/08 429/176 |
| 2016/0211490 A1* | 7/2016 | Hashimoto | B32B 27/40 |
| 2018/0269434 A1 | 9/2018 | Yu et al. | |

FOREIGN PATENT DOCUMENTS

| | | | |
|---|---|---|---|
| JP | 2003320215 A | 11/2003 | |
| JP | 2003323916 A | 11/2003 | |
| JP | 2004296174 A | 10/2004 | |
| JP | 2006103761 A | 4/2006 | |
| JP | 2010182427 A | 8/2010 | |
| JP | 4755312 B2 | 8/2011 | |
| JP | 5045002 B2 | 7/2012 | |
| JP | 5092457 B2 | 9/2012 | |
| JP | 2013100537 A | 5/2013 | |
| JP | 5364694 B2 | 12/2013 | |
| KR | 19980052532 A | 9/1998 | |
| KR | 1020010057152 A | 7/2001 | |
| KR | 100443269 B1 | 7/2004 | |
| KR | 0922490 B1 | 10/2009 | |
| KR | 20100071634 A * | 6/2010 | |
| KR | 1067755 B1 | 9/2011 | |
| KR | 20120021436 A | 3/2012 | |
| KR | 101143300 B1 | 4/2012 | |
| KR | 20120074063 A | 7/2012 | |
| KR | 1218215 B1 | 1/2013 | |
| KR | 20130028281 A | 9/2013 | |
| KR | 20140061146 A | 5/2014 | |
| KR | 101522638 B1 | 5/2015 | |
| KR | 20150058825 A | 5/2015 | |
| KR | 20160017449 A | 2/2016 | |
| KR | 20150138457 A | 3/2016 | |
| KR | 1020160116906 A | 10/2016 | |
| KR | 1020170025716 A | 3/2017 | |
| KR | 1722544 B1 | 4/2017 | |
| KR | 20150037332 A | 6/2017 | |
| KR | 20170065883 A | 6/2017 | |

OTHER PUBLICATIONS

European Search Report for European Patent Application No. 18211929.7 dated Mar. 22, 2019.
Amit Saxenaa et al., "Moisture barrier properties of xylan composite films," Carbohydrate Polymers, Jan. 28, 2011, pp. 1371-1377, vol. 84.
Ankush A.Gokhale et al., "Recent advances in the fabrication of nanostructured barrier films," Journal of Nanoscience and Nanotechnology, 2014, pp. 2157-2177, vol. 14.
Byung Min Yoo et al., "Graphene and Graphene Oxide and Their Uses in Barrier Polymers," Journal of Applied Polymer Science, 2013, pp. 1-23, DOI: 10.1002/app.39628.
Changsoo Jang et al., "Comprehensive Moisture Diffusion Characteristics of Epoxy Molding Compounds over Solder Reflow Process Temperature," IEEE Transactions on Components and Packaging Technologies, Dec. 2010, pp. 809-818, vol. 33, No. 4.
Chien-Sheng Wu et al., "Flexible and transparent moisture getter film containing zeolite," Adsorption, Oct. 22, 2009, pp. 69-74, vol. 16, DOI: 10.1007/s10450-009-9196-3.
E.H. Wong et al., "Moisture absorption and diffusion characterisation of packaging materials—advanced treatment," Microelectronics Reliability, 2003, pp. 2087-2096, vol. 43.
E.H. Wong et al., "Non-Fickian Moisture Properties Characterisation and Diffusion Modeling for Electronic Packages," 1999 Electronic Components and Technology Conference, 1999, pp. 302-306.
G. Choudalakis et al., "Permeability of polymer/clay nanocomposites: a review," European Polymer Journal, Jan. 30, 2009, pp. 967-984, vol. 45.
Hong-Liang Lu et al., "Investigation of Thermal Stability of Atomic-Layer-Deposited MgO Thin Films on Si(100) Using X-Ray Photoelectron Spectroscopy," Electrochemical and Solid-State Letters, Dec. 17, 2009, pp. G25-G28, vol. 13, Issue 3.
Hongrae Jeon et al., "Improved Specific Capacitance of Amorphous Vanadium Pentoxide in a Nanoporous Alumina Template," Electrochemical and Solid-State Letters, Jan. 4, 2010, pp. A25-A28, vol. 13, Issue 3.
I. Sushumna et al., "Stable, highly concentrated suspensions for electronic and ceramic materials applications," Journal of Materials Research, Jan. 31, 2011, pp. 1082-1093, vol. 6, Issue 5, DOI: https://doi.org/10.1557/JMR.1991.1082.
Jitendra Pal Singh et al., "Synthesis and Characterization of Some Alkaline-Earth-Oxide Nanoparticles," Journal of the Korean Physical Society, Apr. 2018, pp. 890-899, vol. 72, No. 8.
Jungmo Kim et al., "Moisture Barrier Composites Made of Non-Oxidized Graphene Flakes," Communication, Feb. 26, 2015, pp. 3124-3129, vol. 11, No. 26.
Karol Pietrak et al., "A review of models for effective thermal conductivity of composite materials," Journal of Power Technologies, 2015, pp. 14-24, vol. 95, Issue 1.
Kominami, Hiroshi et al., "Correlation between some physical properties of titanium dioxide particles and their photocatalytic activity for some probe reactions in aqueous systems," Journal of physical chemistry, 2002, pp. 10501-10507, vol. 106.
Kwong-Yu Chan et al., "Supported mixed metal nanoparticles as electrocatalysts in low temperature fuel cells," Journal of Materials Chemistry, Jan. 23, 2004, pp. 505-516, vol. 14.
Lawrence E. Nielsen, "Models for the Permeability of Filled Polymer Systems," Journal of Macromolecular Science: Part A—Chemistry, 1967, Published online: Oct. 24, 2006, pp. 929-942, vol. 1.
Long-Hua Lee et al., "High-Refractive-Index Thin Films Prepared from Trialkoxysilane-Capped Poly(methyl methacrylate)-Titania Materials," Chemistry of Materials, Feb. 17, 2001, pp. 1137-1142, vol. 13.

(56) References Cited

OTHER PUBLICATIONS

Michael Z. Hu et al., "Semiconductor Nanocrystal Quantum Dot Synthesis Approaches Towards Large-Scale Industrial Production for Energy Applications," Nanoscale Research Letters, 2015, pp. 1-15, vol. 10.

Mostafa Yourdkhani et al., "Thermal, oxygen barrier and mechanical properties of polylactide-organoclay nanocomposites," Composites Science and Technology, Mar. 28, 2013, pp. 47-53, vol. 82.

Pradeep Kumar Raja et al., "Highly Basic CaO Nanoparticles in Mesoporous Carbon Materials and Their Excellent Catalytic Activity," Journal of Nanoscience and Nanotechnology, Jun. 2012, pp. 4613-4620, vol. 12.

Randy De Palma et al., "Silane Ligand Exchange to Make Hydrophobic Superparamagnetic Nanoparticles Water-Dispersible," Chemistry of Materials, 2007, pp. 1821-1831, vol. 19.

Robert Maixner et al., "Testing Water Vapor Transmission Rates for Flexible Barrier Materials Including Metalized Structures," TAPPI 2002 Place Conference, 2002, pp. 1-5.

Shashank Arora et al., "Review of mechanical design and strategic placement technique of a robust battery pack for electric vehicles," Renewable and Sustainable Energy Reviews, Mar. 18, 2016, pp. 1319-1331, vol. 60.

Wolfgang Brockner et al., "Thermal decomposition of nickel nitrate hexahydrate, $Ni(NO_3)_2 \cdot 6H_2O$, in comparison to $Co(NO_3)_2 \cdot 6H_2O$ and $Ca(NO_3)_2 \cdot 4H_2O$," Thermochimica Acta, Feb. 3, 2007, pp. 64-68, vol. 456.

X. Hao et al., "The control of platinum impregnation by PZC alteration of oxides and carbon," Journal of Molecular Catalysis A: Chemical, Jun. 7, 2004, pp. 97-107, vol. 219.

Zhonglai Li et al., "Preparation and characterization of ordered mesoporous carbons on SBA-15 template," Journal of Materials Chemistry, Jan. 20, 2006, pp. 1350-1354, vol. 16.

X.J. Fan et al., "Experimental investigations and model study of moisture behaviors in polymeric materials," Microelectronics Reliability, Apr. 23, 2009, pp. 861-871, vol. 49.

BYK Additivies & Insstrucments, "BYK-P 4102 Data Sheet", Aug. 2015 BYK 2015.

Non-Final Office Action dated Sep. 8, 2020 in U.S. Appl. No. 16/298,229.

KR Office Action dated Apr. 8, 2021 of the Korean Patent Application No. 10-2020-0034686.

\* cited by examiner

BATTERY CASE, BATTERY, AND METHOD FOR FABRICATING A BATTERY

CROSS-REFERENCE TO RELATED APPLICATION

This application claims priority to and the benefit of Korean Patent Application No. 10-2017-0170179, filed in the Korean Intellectual Property Office on Dec. 12, 2017, and all the benefits accruing therefrom under 35 U.S.C. § 119, the entire content of which is incorporated herein by reference.

BACKGROUND

1. Field

This disclosure relates to a battery case and a method for fabricating a battery.

2. Description of the Related Art

An electric vehicle (EV) uses at least one battery system to supply partial or full motive power. The electric vehicle releases less pollution and can provide greater fuel efficiency than a vehicle operated by internal combustion. Some electric vehicles do not use gasoline at all and obtain full motive power from electricity. As research on electric vehicles continues, there is demand for an improved motive power source, for example, an improved battery module.

An electric vehicle using electricity for at least partial motive power may obtain electricity from a plurality of individual battery cells packed as a battery module. For example, the plurality of lithium ion battery cells or cell elements may include the battery module. The lithium ion battery cells or cell elements and the battery module, including a combination thereof, are operated at an increased temperature and accordingly, are often packed with an easily cooled material. In addition, the lithium ion battery elements are degraded when exposed to oxygen or moisture and thus, are often packed in a sealed metal housing, which is impermeable to moisture. However, the ability to shape the metal housing during manufacture is limited. Accordingly, there remains a need for an improved battery case and a method of fabricating the same.

SUMMARY

An embodiment provides a battery case having improved moisture transmission resistivity.

Another embodiment provides a battery including a battery case.

Yet another embodiment provides a method of fabricating a battery having improved moisture transmission resistivity.

In an embodiment, a battery case includes: a container configured to house an electrode assembly, wherein the container includes a bottom wall and a plurality of side walls, the bottom wall and the plurality of side walls are integrated to define a space therein for housing the electrode assembly and to define a top opening opposite the bottom wall, the container includes a polymeric composition including a polymer and an inorganic moisture absorbent dispersed in the polymer, and the battery case has a water vapor transmission rate (WVTR) of less than about 0.05 grams per square meter per day (g/m$^2$/day), when measured at 38° C. and a relative humidity of 100% according to ISO 15106 or ASTM F1249.

The container may include a partition wall extending from a first side wall to an opposite second side wall.

The battery case may further include a lid configured to close at least a part of the top opening of the container and having a positive terminal and/or a negative terminal.

The lid may include the polymeric composition.

The polymer may include a polycarbonate, polyethylene, polypropylene, polyvinyl chloride, polyvinyl acetate, polyvinyl alcohol, polyacrylonitrile, polyamide, polyester, polyphenylene sulfide (PPS), polyphenylene ether, polystyrene, a polycyclic olefin copolymer, an acrylonitrile-butadiene-styrene copolymer, a liquid crystal polymer (LCP), a mixture thereof, an alloy thereof, or a copolymer thereof.

The inorganic moisture absorbent may include silica gel, zeolite, CaO, BaO, MgSO$_4$, Mg(ClO$_4$)$_2$, MgO, P$_2$O$_5$, Al$_2$O$_3$, CaH$_2$, NaH, LiAlH$_4$, CaSO$_4$, Na$_2$SO$_4$, CaCO$_3$, K$_2$CO$_3$, CaCl$_2$, Ba(ClO$_4$)$_2$, Ca, or a combination thereof.

The inorganic moisture absorbent may be included in an amount of less than or equal to about 40 weight percent (wt. %), based on a total weight of the article.

The polymer may include a polyolefin or a liquid crystal polymer.

The polyolefin may include a high density polyethylene.

The liquid crystal polymer may include a structural unit derived from an oligomer of hydroxybenzoic acid.

The polymeric composition may further include a fluorinated resin.

The fluorinated resin may include polytetrafluoroethylene (PTFE), polyvinylidene fluoride (PVDF), polychlorotrifluoroethylene (PCTFE), a mixture thereof, or a copolymer thereof.

The polymeric composition may further include graphite.

An aspect ratio of the graphite may be greater than or equal to about 100.

The inorganic moisture absorbent may include CaO, a zeolite, or a combination thereof.

The polymeric composition may further include a moisture barrier material comprising a crystalline polymer that is the same as or different from the polymer, an inorganic material particle different from the inorganic moisture absorbent, or a fiber-shaped material.

The moisture barrier material may include wollastonite, mica, barium sulfate, kaolin, talc, nanoclay, a carbon fiber, a glass fiber, a whisker of graphite, alumina, iron, silicon carbide, or silicon, or a mixture thereof.

In another embodiment, a battery includes the battery case according to the embodiment and an electrode assembly including a positive electrode and a negative electrode housed in the container of the battery case.

The electrode assembly may not include a metal exterior material.

The electrode assembly may be an electrode assembly for a rechargeable lithium battery.

Another embodiment provides a method of fabricating a battery including: molding a polymeric composition including a polymer and an inorganic moisture absorbent dispersed therein to prepare a battery case including a container configured to house an electrode assembly including a positive electrode and a negative electrode, wherein the battery case has a water vapor transmission rate (WVTR) of less than about 0.05 g/m$^2$/day, when measured at 38° C. and a relative humidity of 100% according to ISO 15106 or ASTM F1249; disposing the electrode assembly including the positive electrode and the negative electrode in the container of the battery case; and injecting an electrolyte solution in the container including the electrode assembly.

The battery case according to an embodiment may be fabricated to have a desired shape and a desired size with a low cost through a simple and fast process by using a composition including a polymer and an inorganic moisture absorbent dispersed therein, and a battery may simply be fabricated by housing an electrode assembly separately prepared in the battery case, and injecting electrolyte thereto. In addition, the battery case has a light weight and excellent moisture transmission resistivity, and thus may be usefully used to fabricate a battery module for an electric vehicle which houses a plurality of battery cells and supplies large capacity of electricity and the like.

BRIEF DESCRIPTION OF THE DRAWINGS

The above and other advantages and features of this disclosure will become more apparent by describing in further detail exemplary embodiments thereof with reference to the accompanying drawings.

DETAILED DESCRIPTION

Figure 1:
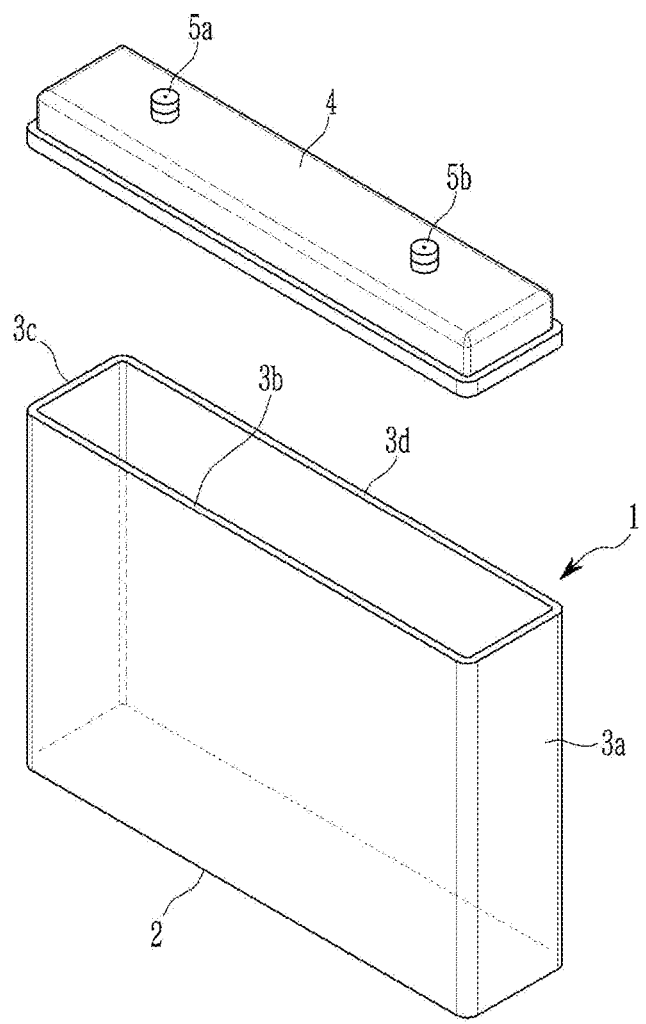
FIG. 1 is an exploded perspective view showing an exemplary embodiment of a battery case.

Advantages and characteristics of this disclosure, and a method for achieving the same, will become evident referring to the following example embodiments together with the drawings attached hereto. Hereinafter, embodiments of the present disclosure are described in detail. However, these embodiments are exemplary, the present disclosure is not limited thereto, and the embodiments should not be construed as being limited to the embodiments set forth herein.

Unless defined otherwise, all terms (including technical and scientific terms) in the specification may be defined as commonly understood by one having ordinary skilled in the art. The terms defined in a generally-used dictionary may not be interpreted ideally or exaggeratedly unless clearly defined. In addition, unless explicitly described to the contrary, the word "comprise" and variations such as "comprises" or "comprising," will be understood to imply the inclusion of stated elements but not the exclusion of any other elements.

Further, the singular includes the plural unless mentioned otherwise.

In the drawings, the thickness of each element is exaggerated for clarity. Like reference numerals designate like elements throughout the specification. It will be understood that when an element such as a layer, film, region, or plate is referred to as being "on" another element, it can be directly on the other element or intervening elements may also be present. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein. The terminology used herein is for the purpose of describing particular embodiments only and is not intended to be limiting.

As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10%, or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An electric vehicle (EV) uses at least one battery system to supply partial or full motive power. The electric vehicle discharges fewer pollutants as compared with a traditional vehicle operated by an internal combustion engine and can provide greater fuel efficiency. Some electric vehicles use no gasoline at all and obtain their entire motive power from electricity. Accordingly, there is a continuing need for an improved power source for electric vehicles, such as, for example, an improved battery or battery module.

A rechargeable lithium battery capable of being charged and discharged and having high energy density is desired for electric vehicles. However, when moisture is permeated into a battery through a battery case, hydrofluoric acid (HF) may be generated therein and cause performance degradation. In order to prevent the performance degradation, an aluminum material having improved resistance to moisture transmission can be used in a case for a rechargeable lithium battery. In an embodiment, an electrode assembly including a positive and a negative electrode is inserted into a case, such as an aluminum pouch, and then together into an aluminum can, and sealed to make a battery cell, and a plurality of the battery cells are then used to form a battery module. However, since this method uses a complicated assembly process, extensive manufacturing time, and a high cost, there still remains much room for improvement. Accordingly, a cell-module with an integrated structure, without the need for forming a separate battery cell after forming the electrode assembly, is desirable. To provide a cell-module having an integrated structure, further improvement to mechanical strength, moisture transmission resistance, and the like, are desirable.

On the other hand, since a battery case formed of a metal has a limited shape due to a limit in metal manufacture technology, a multistep process may be needed to provide a battery case having a desired shape and/or size, resulting in higher cost and a high manufacture time. In addition, larger metal cases are heavy due to the weight of the metal and, when a plurality of containers is included in order to house a plurality of battery cells, the cases become heavier and even more expensive. Accordingly, there is a continuing need for an efficient battery case and battery module capable of solving the problems of heat management, moisture transmission, and the like, and having a lower cost for manufacture.

The present disclosure includes a battery case easily moldable into a desired size and shape comprising a light and inexpensive polymer resin and a battery including the same. The present embodiments of this disclosure can be formed by molding a mixture, prepared by dispersing an inorganic moisture absorbent in a polymer matrix, into a battery case having a reduced water vapor transmission rate of less than about 0.05 $g/m^2/day$, which is a remarkable improvement in moisture transmission resistivity.

In other words, a battery case according to an embodiment includes a container configured to house an electrode assembly, wherein the container comprises a polymeric composition including a polymer and an inorganic moisture absorbent dispersed in the polymer, wherein the container includes a bottom wall and a plurality of sidewalls integrated to define a space for housing the electrode assembly and to define a top opening opposite to the bottom wall, and the container has a water vapor transmission rate (WVTR) of less than about 0.05 $g/m^2/day$, when measured at 38° C. and a relative humidity of 100% according to ISO 15106 or ASTM F1249.

In an example embodiment, the container may include a plurality of cell compartments separated by a partition wall disposed in the space.

The container of the battery case according to the embodiment may have an equivalent moisture transmission resistivity to that of a metal pouch-shaped exterior material, which can be used for wrapping an electrode assembly for a rechargeable lithium battery.

The container of the battery case according to the embodiment has a space for housing an electrode assembly including positive and negative electrodes and having the aforementioned moisture transmission resistivity, and thus a battery may be formed by directly introducing the electrode assembly into the battery container without wrapping the electrode assembly with an additional exterior material, such as, a metal pouch and the like.

In addition, since the battery container according to an embodiment includes a plurality of battery cell compartments separated by a partition wall disposed in the space, a battery module including a plurality of battery cells may be fabricated by directly introducing each electrode assembly into each battery cell compartment in the battery container without wrapping each electrode assembly with a metal pouch and the like. In other words, the battery case according to an embodiment may be a cell-module integrated battery case.

An electrode assembly including positive and negative electrodes can be formed, wrapped with a metal pouch having moisture transmission resistivity to form a battery cell, and then packed together into a metallic battery case to manufacture a battery module. However this process can be complicated, time consuming, and expensive.

As aforementioned, the battery case according to an embodiment may be easily fabricated into a one cell-module integrated unit, and sharply reduce time and cost of fabrication of the battery module as compared with a metal battery case. In addition, the battery case according to an embodiment includes a polymer material as a main component, and thus has a light weight, design freedom, and a low manufacturing cost.

In an example embodiment, the container of the battery case may have a water vapor transmission rate of less than or equal to about 0.04 $g/m^2/day$. In addition, the water vapor transmission rate may be adjusted to less than or equal to about 0.03 $g/m^2/day$ by adjusting the type of polymer used, the type and amount of the inorganic moisture absorbent used, or a combination thereof, in the polymer composition forming the container of the battery case. When the polymer composition further includes the following additional components, the fabricated container of the battery case may have a reduced water vapor transmission rate of less than or equal to about 0.025 $g/m^2/day$, less than or equal to about 0.020 $g/m^2/day$, less than or equal to about 0.015 $g/m^2/day$, or less than or equal to about 0.01 $g/m^2/day$.

For example, the polymer composition for forming the battery case according to an embodiment may include polycarbonate, polyethylene, polypropylene, a vinyl polymer, polyamide, polyester, polyphenylene sulfide (PPS), polyphenylene ether, polystyrene, a polycyclic olefin copolymer, an acrylonitrile-butadiene-styrene copolymer, a liquid crystal polymer (LCP), a mixture thereof, an alloy thereof, or a copolymer thereof, as the base polymer, but is not limited thereto.

In an example embodiment, the polymeric composition may include polyolefin or a liquid crystal polymer as the base polymer, and the polyolefin may include high density polyethylene (HDPE), and the liquid crystal polymer may include a structural unit derived from an oligomer of hydroxybenzoic acid.

For example, the liquid crystal polymer may be a copolymer of at least two selected from HNA (2,6-hydroxynaphthoic acid), TPA (terephthalic acid), IPA (isophthalic acid), HQ (hydroquinone), BP (biphenol), PET (polyethylene terephthalate), and PEN (polyethylene naphthalate) with the oligomer of hydroxybenzoic acid (HBA). In an example embodiment, the base polymer may include a copolymer of at least about 40 mol % of the oligomer of hydroxybenzoic acid and less than or equal to about 60 mol % of the at least two selected from the above monomers or polymers.

The high density polyethylene or the liquid crystal polymer has a low water vapor transmission rate, and thereby moisture transmission resistivity of the battery case may be further improved.

The inorganic moisture absorbent may include at least one of silica gel, zeolite, CaO, BaO, $MgSO_4$, $Mg(ClO_4)_2$, MgO, $P_2O_5$, $Al_2O_3$, $CaH_2$, NaH, $CaSO_4$, $Na_2SO_4$, $CaCO_3$, $K_2CO_3$, $CaCl_2$), $Ba(ClO_4)_2$, and Ca.

In an example embodiment, the inorganic moisture absorbent may include a zeolite, CaO, or a combination thereof.

Zeolites having various pore sizes are commercially available, and when the battery case according to an embodiment includes a zeolite as an inorganic moisture absorbent, the zeolite having a pore size ranging from about 3 Angstroms (Å) to about 10 Å, for example, about 3 Å to about 8 Å, about 3 Å to about 7 Å, or about 3 Å to about 5 Å may be used. Since a water molecule has a size of about 3.8 Å, the water molecule may be easily trapped in the pore of the zeolite. In addition, the zeolite may have an average particle diameter ranging from about 2 micrometers (μm) to about 10 μm and include aluminum in an amount of greater than or equal to about 40 wt %. When the amount of aluminum is larger than the range, excellent hygroscopicity may be exhibited.

When the inorganic moisture absorbent is CaO, a particle size of CaO may be about 0.1 μm to about 1 μm, for example, about 0.1 μm to about 0.9 μm, about 0.1 μm to about 0.8 μm, about 0.1 μm to about 0.7 μm, about 0.1 μm to about 0.6 μm, about 0.1 μm to about 0.5 μm, about 0.1 μm to about 0.4 μm, about 0.2 μm to about 0.5 μm, or about 0.2 μm to about 0.4 μm.

Figure 3:
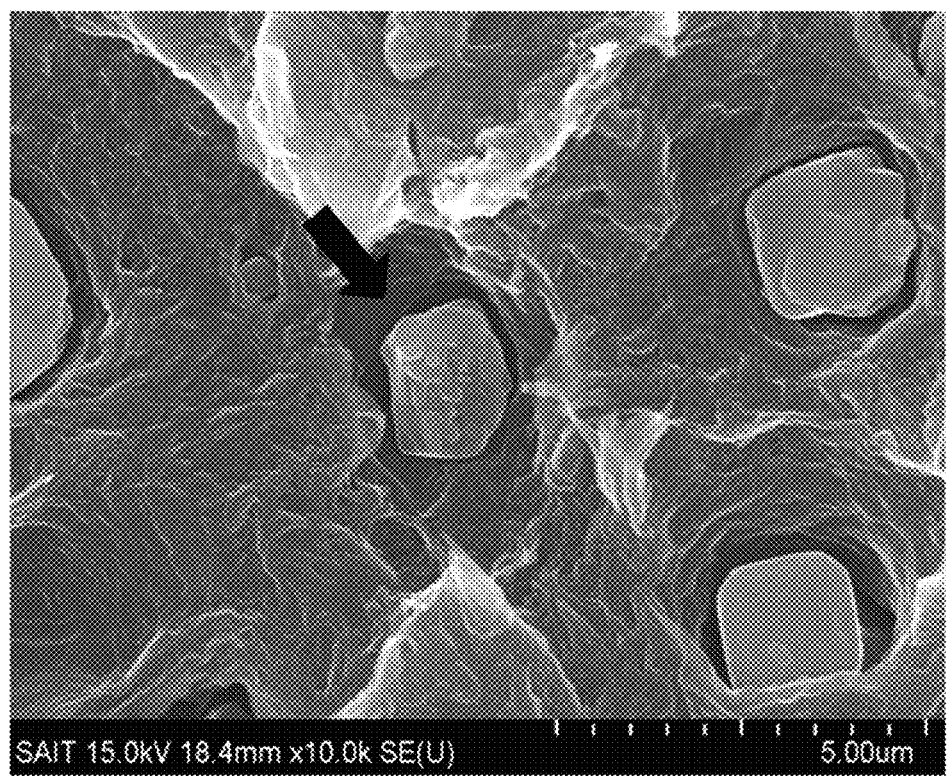
FIG. 3 is a scanning electron microscope (SEM) photograph showing an article formed by injection-molding a composition including 90 wt % of high density polyethylene (HDPE) and 10 wt % of a zeolite as an inorganic moisture absorbent.
Figure 4:
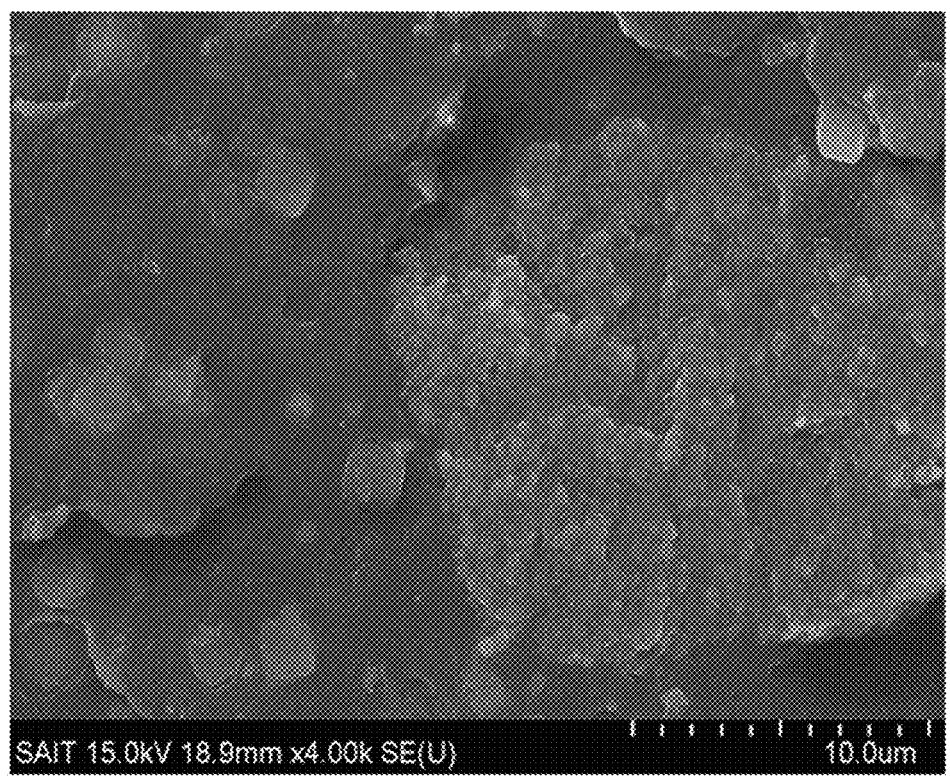
FIG. 4 is a scanning electron microscope (SEM) photograph showing an article formed by injection-molding a composition including 70 wt % of high density polyethylene (HDPE) and 20 wt % of a zeolite and 10 wt % of CaO as an inorganic moisture absorbent.

Zeolites can be physical moisture absorbents that absorb water through a particle having a pore, while CaO can be a chemical water absorbent that absorbs water through a chemical reaction with a water molecule. Accordingly, in an embodiment, a water vapor transmission rate of the battery case fabricated therefrom may be further reduced by including both a zeolite and CaO as an inorganic moisture absorbent. Regarding the SEM photograph of FIG. 3, an article is formed by injection-molding a composition material including 10 wt % of a zeolite along with 90 wt % of high density polyethylene (HDPE). In this case, a pore is successfully formed around a zeolite particle (refer to FIG. 3). In contrast, regarding the SEM photograph of FIG. 4, when an article is formed by injection-molding a composition including 20 wt % of a zeolite and 10 wt % of CaO along with 70 wt % of HDPE, pores formation is significantly reduced (refer to FIG. 4). In other words, as for an article including CaO or CaO along with a zeolite as an inorganic moisture absorbent, a pore is not formed around the inorganic moisture absorbent during the injection molding, and accordingly, moisture transmission resistivity of the article may be further increased, since there is no pore usable as a moisture-moving path in the article.

The inorganic moisture absorbent may be included in an amount of less than or equal to about 40 wt %, for example less than or equal to about 1 wt % to about 40 wt %, for example, about 2 wt % to about 35 wt %, about 3 wt % to about 35 wt %, for example, about 3 wt % to about 30 wt %, for example, about 5 wt % to about 30 wt %, for example, about 10 wt % to about 30 wt %, about 10 wt % to about 25 wt %, or about 10 wt % to about 20 wt % based on a total weight of the article.

When the article does not include the inorganic moisture absorbent and consists of the base polymer alone, it may have a water vapor transmission rate of less than or equal to about 0.5 $g/m^2/day$. However, when the battery case is molded by including the base polymer with the inorganic moisture absorbent within the ranges disclosed herein, it may have a reduced water vapor transmission rate of less than about 0.05 $g/m^2/day$, for example, less than about 0.045 $g/m^2/day$, less than or equal to about 0.040 $g/m^2/day$, less than or equal to about 0.035 $g/m^2/day$, less than or equal to about 0.030 $g/m^2/day$, less than or equal to about 0.025 $g/m^2/day$, less than or equal to about 0.023 $g/m^2/day$, less than or equal to about 0.022 $g/m^2/day$, less than or equal to about 0.021 $g/m^2/day$, less than or equal to about 0.020 $g/m^2/day$, less than or equal to about 0.015 $g/m^2/day$, or less than or equal to about 0.01 $g/m^2/day$.

As the container of the battery case according to an embodiment has the aforementioned water vapor transmission rate, an electrode assembly including negative and positive electrodes avoids fabrication into a unit cell by using an additional metal pouch and the like, and instead can be fabricated into a battery by being directly housed in the container of the battery case according to an embodiment and injecting an electrolyte therein.

In an embodiment, the polymeric composition may further include a fluorinated resin.

When the polymeric composition further includes a fluorinated resin of polytetrafluoroethylene (PTFE), polyvinylidene fluoride (PVDF), polychlorotrifluoroethylene (PCTFE), a mixture thereof, or a copolymer thereof, a water vapor transmission rate of the container of the battery case fabricated therefrom may further be lowered.

The fluorinated resin has hydrophobicity, and thus when the fluorinated resin is included in an amount of about 20 wt %, for example, less than or equal to about 15 wt %, for example, less than or equal to about 10 wt %, or about 3 wt % to about 10 wt %, for example, about 5 wt % to about 10 wt % based on a total weight of the polymeric composition, an article fabricated therefrom may have a barrier effect that blocks moisture from the surface of the article contacting the air. As shown in the Examples that will be described later, when the fluorinated resin is further included within the ranges disclosed herein, the container of the battery case has a further reduced moisture transmission.

Furthermore, the polymeric composition may include graphite in an amount of about 40 wt %, less than or equal to about 1 wt % to about 40 wt %, for example, about 2 wt % to about 40 wt %, about 3 wt % to about 30 wt %, about 3 wt % to about 25 wt %, about 5 wt % to about 25 wt %, about 5 wt % to about 20 wt %, about 5 wt % to about 15 wt %, or about 5 wt % to about 10 wt % based on a total weight of the polymeric composition. When the graphite is included within the ranges disclosed herein, the battery case fabricated therefrom has a further reduced water vapor transmission rate.

A particle size of the graphite may be about 1 μm to about 100 μm, for example, about 5 μm to about 100 μm, about 10 μm to about 100 μm, about 15 μm to about 100 μm, about 20 μm to about 100 μm, about 25 μm to about 100 μm, or about 30 μm to about 100 μm, but is not limited thereto.

The graphite may have an aspect ratio (i.e., a ratio of the longest diameter relative to the shortest diameter) of greater than or equal to about 10, for example, greater than or equal to about 20, greater than or equal to about 30, greater than or equal to about 40, greater than or equal to about 50, greater than or equal to about 60, greater than or equal to about 70, greater than or equal to about 80, greater than or equal to about 90, greater than or equal to about 100, greater than or equal to about 110, greater than or equal to about 120, greater than or equal to about 130, greater than or equal to about 140, greater than or equal to about 150, greater than or equal to about 160, for example, greater than or equal to about 170, greater than or equal to about 180, greater than or equal to about 190, or greater than or equal to about 200, but is not limited thereto.

Graphite having the aforementioned particle size and aspect ratio prevents a moisture permeation path from outside of the container and thus lengthens a moisture moving path from outside of the container of the battery case toward the inside thereof, and accordingly, reduces a water vapor transmission rate. Accordingly, graphite having a high aspect ratio has a larger effect of reducing a water vapor transmission rate than graphite having a low aspect ratio. As shown from the Examples that will be described later, a battery case including expanded graphite having an aspect ratio of greater than or equal to about 100 shows a water vapor transmission rate of about 0.007 g/m$^2$/day as compared to about 0.022 g/m$^2$/day for a battery case including about 10 wt % of graphite having an aspect ratio of about 50.

The polymeric composition may further include suitable materials as moisture barrier materials, in addition to the graphite. Such a moisture barrier material may further include, for example, a moisture barrier material selected from a crystal of a polymer that is the same as or different from the base polymer, an inorganic material particle different from the inorganic moisture absorbent, or a fiber-shaped material such as a glass fiber or a carbon fiber in the composition. Specific examples of the moisture barrier material may include wollastonite, mica, whisker, barium sulfate, kaolin, talc, nanoclay, a carbon fiber or a glass fiber having an aspect ratio of greater than or equal to about 100, or a mixture thereof, but are not limited thereto. The whisker may include a whisker of graphite, alumina, iron, silicon carbide, or silicon.

The battery case may be a battery case for a rechargeable lithium battery, but is not limited thereto, and may be a case for a battery housing a plurality of electrode assemblies and having moisture transmission resistivity.

The battery case may further include a lid configured to close at least a part of the top opening of the container, for example, to seal the top opening of the container. The lid may have at least one of a positive terminal and a negative electrode terminal, for example, both of the positive terminal and the negative electrode terminal. The lid may include the same material as the container or the lid may include a different material from the container.

Hereinafter, a battery case according to an embodiment is described with reference to the appended drawings.

FIG. 1 is an exploded perspective view of a battery case according to an embodiment.

Referring to FIG. 1, a battery case according to an embodiment includes a container 1 including a bottom wall 2 and a plurality of (e.g., 3, 4, or greater) side walls 3a, 3b, 3c, and 3d that are integrated to provide an internal space for housing an electrode assembly. The container 1 has a top opening or an open side opposite to the bottom wall 2. An electrode assembly may be housed in the container 1 through the top opening or open side.

Herein, the term "integrated" indicates a state wherein the bottom wall is connected to the plurality of side walls, and thus all the sides except for the top opening provide a closed and sealed space.

A method for this unification is not particularly limited, but may include, for example, a method of molding the polymeric composition including the base polymer and the inorganic moisture absorbent, as described later, into a container having a space for housing electrodes therein by integrating the bottom wall with the plurality of side walls, or a method of separately molding the bottom wall and the plurality of side walls, and then, connecting them into a container having a space for housing electrodes therein in a suitable method, such as welding, boning, or the like. As aforementioned, the method for unification is not limited to a particular method, but may include various suitable methods, through which a container of a battery case is fabricated to have a space for housing an electrode assembly by integrating the bottom wall and the plurality of side walls.

The battery case may further include a lid 4 to close (e.g., seal) at least a part, for example, the entire top opening of the container 1. The lid 4 may have at least one of the positive terminal 5a and the negative terminal 5b. The lid 4 may include the same material as the container 1 or a different material from the container 1, and the battery case according to an example embodiment may be entirely sealed by covering the top opening of the container 1 with the lid 4 and sealing the same.

Figure 2:
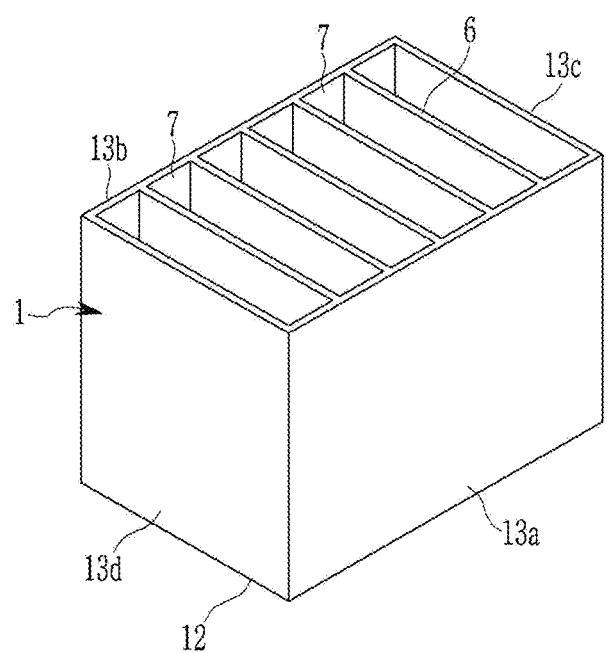
FIG. 2 is an exploded perspective view showing an exemplary embodiment of a battery case.

FIG. 2 is an exploded perspective view of a battery case according to another embodiment.

Referring to FIG. 2, a container 1 of a battery case according to an example embodiment has a space formed by integrating a bottom wall 12 with a plurality of side walls (e.g., 3, 4, or more) 13a, 13b, 13c, and 13d and a top opening facing the bottom wall 12, and in the space, at least one partition wall 6 (e.g., 2, 3, 4, 5, or more) is provided. Accordingly, the container may include a plurality of (e.g., greater than or equal to 2, for example, greater than or equal to 3, for example, greater than or equal to 4, or for example, greater than or equal to 5) battery cell compartments 7 separated by the partition walls 6. Each battery cell compartment 7 may include the electrode assembly that will be described later (for example, the electrode assembly may comprise a positive electrode 8a and a negative electrode 8b), and a battery module may be fabricated by housing at least two electrode assemblies, each of which is housed in each battery cell compartment, and injecting an electrolyte solution therein. After disposing the electrode assembly and injecting the electrolyte solution, the top opening of the container 1 may be closed or sealed with a lid, which is not shown.

FIGS. 1 and 2 show the container 1 of the battery case having a rectangular parallelepiped shape, but the battery case according to an embodiment may have various shapes and sizes.

Another embodiment provides a battery including the battery case and an electrode assembly housed in the container of the battery case and including a positive electrode and a negative electrode. The battery case is the same as described above.

The electrode assembly includes a positive electrode, a negative electrode, and a separator disposed therebetween. The electrode assembly may further include, for example, an aqueous or non-aqueous electrolyte solution in the separator. The type of electrode assembly is not particularly limited. In an embodiment, the electrode assembly may include an electrode assembly for a rechargeable lithium battery. The positive electrode, the negative electrode, the separator, and the electrolyte solution of the electrode assembly may be desirably selected and are not particularly limited. Hereinafter, the electrode assembly for a rechargeable lithium battery is exemplified but the present disclosure is not limited thereto.

The positive electrode may include, for example, a positive active material disposed on a positive current collector and may further include at least one of a conductive material and a binder. The positive electrode may further include a filler. The negative electrode may include, for example a negative active material disposed on a negative current collector and may further include at least one of a conductive material and a binder. The negative electrode may further include a filler.

The positive active material may include, for example a (solid solution) oxide including lithium but is not particularly limited as long as it is a material capable of intercalating and deintercalating lithium ions electrochemically.

The positive active material may be a layered compound such as lithium cobalt oxide ($LiCoO_2$), lithium nickel oxide ($LiNiO_2$), and the like, a compound substituted with one or more transition metal; a lithium manganese oxide such as chemical formula $Li_{1+x}Mn_{2-x}O_4$ (wherein, x is 0 to 0.33), $LiMnO_3$, $LiMn_2O_3$, $LiMnO_2$, and the like; lithium copper oxide ($Li_2CuO_2$), vanadium oxide such as $LiV_3O_8$, $LiFe_3O_4$, $V_2O_5$, $Cu_2V_2O_7$, and the like; a Ni site-type lithium nickel oxide represented by chemical formula $LiNi_{1-x}M_xO_2$ (wherein, M=Co, Mn, Al, Cu, Fe, Mg, B, or Ga and x=0.01 to 0.3); a lithium manganese composite oxide represented by chemical formula $LiMn_{2-x}M_xO_2$ (wherein, M=Co, Ni, Fe, Cr, Zn, or Ta and x=0.01 to 0.1) or $Li_2Mn_3MO_8$ (wherein, M=Fe, Co, Ni, Cu, or Zn); $LiMn_2O_4$ where a part of Li is substituted with an alkaline-earth metal ion; a disulfide compound; $Fe_2(MoO_4)_3$, and the like, but is not limited thereto.

Examples of the conductive material may be carbon black such as Ketjen black, acetylene black, and the like, natural graphite, artificial graphite, and the like, but is not particularly limited as long as it may increase conductivity of the positive electrode.

The binder may be for example, polyvinylidene fluoride, an ethylene-propylene-diene terpolymer, a styrene-butadiene rubber, an acrylonitrile-butadiene rubber, a fluorine rubber, polyvinylacetate, polymethylmethacrylate, polyethylene, nitrocellulose, and the like, but is not particularly limited as long as it may bind the (positive or negative) active material and the conductive material on the current collector. Examples of the binder may be polyvinyl alcohol, carboxylmethyl cellulose (CMC), starch, hydroxypropyl cellulose, recycled cellulose, tetrafluoroethylene, polyethylene, polypropylene, an ethylene-propylene-diene copolymer (EPDM), sulfonated EPDM, a styrene butyrene rubber, a fluorine rubber, various copolymers thereof, polymeric highly saponified polyvinyl alcohol, and the like.

The negative active material may be for example, carbonaceous materials such as natural graphite, artificial graphite, expanded graphite, carbon fiber, non-graphizable carbon, carbon black, carbon nanotube, fullerene, activated carbon, and the like; a metal or metalloid, such as, Al, Si, Sn, Ag, Bi, Mg, Zn, In, Ge, Pb, Pd, Pt, Ti, and the like that may be an alloy with lithium and a compound including such an element; a composite material of a metal or metalloid and a compound thereof and carbon and graphite materials; a lithium-containing nitride, and the like. Among them, carbonaceous active materials, silicon-based active materials, tin-based active materials, or silicon-carbon-based active materials may be desirably used and may be used alone or in a combination of two or more.

The separator is not particularly limited and may be any separator of a rechargeable lithium battery. For example, a porous film or non-woven fabric having excellent high rate discharge performance may be used alone or in a mixture thereof. The separator may include pores, and the pores may have generally a pore diameter of about 0.01 to about 10 µm. The separator may have a thickness of about 5 to about 300 µm. A substrate of the separator may include, for example, a polyolefin-based resin, a polyester-based resin, polyvinylidene fluoride (PVDF), a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and the like. When the electrolyte is a solid electrolyte such as a polymer, the solid electrolyte may function as a separator.

The conductive material is a component to further improve conductivity of an active material and may be included in an amount of about 1 wt % to about 30 wt % based on a total weight of the electrode, but is not limited thereto. Such a conductive material is not particularly limited as long as it does not cause chemical changes of a battery and has conductivity, and may be for example, graphite such as natural graphite or artificial graphite; carbon black such as acetylene black, Ketjen black, channel black, furnace black, lamp black, summer black, and the like; a carbon derivative such as carbon nanotube, fullerene, and the like, a conductive fiber such as a carbon fiber or a metal fiber, and the like; a carbon fluoride, a metal powder such as aluminum, a nickel powder, and the like; a conductive whisker such as zinc oxide, potassium titanate, and the like; a conductive metal oxide such as a titanium oxide; a conductive organic material such as a polyphenylene derivative, and the like.

The filler is an auxiliary component to suppress expansion of an electrode, is not particularly limited as long as it does not cause chemical changes of a battery and is a fiber-shaped material, and may be for example, an olefin-based polymer such as polyethylene, polypropylene, and the like; a fiber-shaped material such as a glass fiber, a carbon fiber, and the like.

In the electrode, the current collector may be a site where electron transports in an electrochemical reaction of the active material and may be a negative current collector and a positive current collector according to kinds of the electrode. The negative current collector may have a thickness of about 3 µm to about 500 µm. The negative current collector is not particularly limited as long as it does not cause chemical changes of a battery and has conductivity and may be, for example, copper, stainless steel, aluminum, nickel, titanium, fired carbon, copper or stainless steel that is surface-treated with carbon, nickel, titanium, silver, or the like, an aluminum-cadmium alloy, and the like.

The positive current collector may have a thickness of about 3 µm to about 500 µm, but is not limited thereto. Such a positive current collector is not particularly limited as long as it does not cause chemical changes of a battery and has high conductivity and may be, for example, stainless steel, aluminum, nickel, titanium, fired carbon, or aluminum or stainless steel that is surface-treated with carbon, nickel, titanium, silver, or the like.

The current collectors may have a fine concavo-convex shape on its surface to reinforce a binding force of the active material and may be used in various shapes of a film, a sheet, a foil, a net, a porous film, a foam, a non-woven fabric, or the like.

The lithium-containing non-aqueous electrolyte solution may consist of a non-aqueous electrolyte and a lithium salt.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyro lactone, 1,2-dimethoxyethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, an ether derivative, methyl propionate, ethyl propionate, and the like.

The lithium salt is a material that is dissolved in the non-aqueous electrolyte solution and may be, for example, LiCl, LiBr, LiI, LiClO$_4$, LiBF$_4$, LiBioClio, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, a a lower aliphatic lithium carbonate, a lithium 4-phenyl borate, a lithium imide, and the like.

An organic solid electrolyte, an inorganic solid electrolyte, and the like may be used as needed.

The organic solid electrolyte may be, for example, polyethylene derivative, a polyethylene oxide derivative, a polypropylene oxide derivative, a phosphoric acid ester polymer, a poly agitation lysine, polyester sulfide, polyvinyl alcohol, polyvinylidene fluoride, a polymer including an ionic leaving group, and the like.

The inorganic solid electrolyte may be, for example, nitrides, halides, sulfates, and the like, of Li such as Li$_3$N, LiI, Li$_5$NI$_2$, Li$_3$N—LiI—LiOH, LiSiO$_4$, Li$_2$SiS$_3$, Li$_2$SiO$_4$, Li$_3$PO$_4$—Li$_2$S—SiS$_2$, and the like.

The non-aqueous electrolyte solution may include, for example, pyridine, triethylphosphite, triethanolamine, cyclic ether, ethylene diamine, n-glyme, hexa phosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride in order to improve charge and discharge characteristics, flame retardancy, and the like. As needed, in order to endow inflammability, a halogen-containing solvent such as carbon tetrachloride, ethylene trifluoride, and the like may be further added and in order to improve high temperature storage characteristics, carbon dioxide gas may be further added.

As described above, a battery including a battery case according to an embodiment avoids manufacture of a unit cell including metal exterior materials consisting of additional moisture transmission resistivity materials on each electrode assembly, and thus an electrode assembly housed in the container of the battery case avoids use of additional metal exterior materials.

Another embodiment provides a method of fabricating a battery including: molding a polymeric composition, including a base polymer and an inorganic moisture absorbent dispersed therein, to prepare a battery case including a container configured to house an electrode assembly including a positive electrode and a negative electrode, and having a water vapor transmission rate (WVTR) of less than about 0.05 g/m$^2$/day, as measured at 38° C. and a relative humidity of 100% according to ISO 15106 or ASTM F1249; housing the electrode assembly including each positive electrode and negative electrode in the container of the battery case; and injecting an electrolyte solution in the container including the electrode assembly.

The composition including the base polymer and the inorganic moisture absorbent may be easily molded into a battery case having a desirable size and shape according to an embodiment by various suitable molding methods, for example, extrusion molding, injection molding, blow molding, press molding, and the like.

The battery fabricating method avoids metal exterior material, and thus includes a simplified process for easy and fast fabrication of a battery or a battery module.

Particularly, the battery case may be manufactured to include at least two battery cell compartments having a desired size with a desired number by forming at least one partition wall in the space of the battery container, and accordingly, a desired number of electrode assemblies having a desired size can be introduced into at least two battery cell compartments without being wrapped with an additional metal pouch and the like, thus allowing free fabrication a battery module including a desired number of electrode assemblies. This battery module may become lighter in terms of total weight due to the lighter weight of the battery case and may show improved energy efficiency.

In another embodiment, a polymeric composition for a battery case includes a base polymer, an inorganic moisture absorbent, a fluorinated resin, and graphite. The polymeric composition may be molded into a battery case, and the molded battery case may have water vapor transmission rate (WVTR) of less than about 0.05 g/m$^2$/day, as measured at 38° C. and a relative humidity of 100% according to ISO 15106 or ASTM F1249.

In the polymeric composition, the inorganic moisture absorbent may be included in an amount of less than or equal to about 40 wt %, for example about 1 wt % to about 40 wt % based on a total weight of the polymeric composition, the fluorinated resin may be included in an amount of less than or equal to about 20 wt % based on a total weight of the polymeric composition, the graphite may be included in an amount of less than or equal to about 40 wt %, less than or equal to about 1 wt % to about 40 wt % based on a total weight of the polymeric composition, and the base polymer is included in a balance amount.

The base polymer, the inorganic moisture absorbent, the fluorinated resin, and the graphite can be the same as in the battery case according to an embodiment, and thus detailed explanations thereof are not provided.

Hereinafter, the embodiments are described with reference to examples and comparative examples. The following examples and comparative examples are exemplary but do not limit the scope of the present disclosure.

Example: Preparation of a Polymeric Composition for a Battery Case and Measurement of Water Vapor Transmission Rate As a base polymer, High density polyethylene (HDPE) having a weight average molecular weight of greater than or equal to about $10^5$ g/mol (HDPE B230A) is purchased from Hanwha Total Petrochemical Co., Ltd., and a liquid crystal polymer (HBA-HNA) is obtained by copolymerizing HBA (hydroxybenzoic acid) and HNA (2,6-hydroxynaphthoic acid) in a mole ratio of 2.7:1. Zeolite (COLITE-P, Cosmo Fine Chemicals Co., Ltd.) and calcium oxide (CaO) (Prosgen, Hwsung Chemical Co., Ltd.) are prepared as inorganic moisture absorbents. PTFE (polytetrafluoroethylene) having a weight average molecular weight of about $7 \times 10^4$ to $8 \times 10^4$ g/mol (Lubeflon® K401 PTFE, Polis SRL) as a fluorinated resin is prepared, and general graphite having an average particle diameter of greater than or equal to about 10 μm and an aspect ratio of about 50 (TIMREX® KS44, Imerys Company) and expanded graphite having an aspect ratio of about 100 (TIMREX® C-Therm011, Imerys Company) as graphite are respectively prepared.

The prepared base polymers are individually injection-molded, and each water vapor transmission rate thereof is measured and shown in Table 1 as Comparative Examples 1 and 2. The base polymers are mixed with the inorganic moisture absorbent, the fluorinated resin, and the graphite in a ratio shown in Table 1, and a polymeric composition obtained therefrom is molded to form an article. Specifically, each component shown in Table 1 is brought into, and injection-molded, in an extruder heated at 280° C. and including two screw axies, while also mixed to form a disk-shaped article having a thickness of about 1 mm and a diameter of 30 mm. Each article is measured for water vapor transmission rate according to ISO15106-3 with an Aquatran equipment (Mocon Inc.) at 38° C. under relative humidity of 100%, and the results are shown in Table 1. Component amounts in Table 1 are provided in weight percent.

On the other hand, 5aan article molded by including an inorganic moisture absorbent in addition to the base polymer, according to an embodiment, does not show much difference in the water vapor transmission rate depending on the base polymer used. In addition, when a liquid crystal polymer is used, the effect of reducing a water vapor transmission rate is similar, but mechanical properties such as tensile strength and the like are significantly improved,

TABLE 1

| | Polymer | | Inorganic moisture absorbent | | Fluorine resin | Graphite | | Water vapor transmission |
|---|---|---|---|---|---|---|---|---|
| | HDPE | LCP | CaO | zeolite | PTFE | Expanded graphite | General graphite | rate (g/m²/day) |
| Comparative Example 1 | 100 | 0 | 0 | 0 | 0 | 0 | 0 | 0.400 |
| Comparative Example 2 | 0 | 100 | 0 | 0 | 0 | 0 | 0 | 0.070 |
| Comparative Example 3 | 90 | 0 | 0 | 0 | 10 | 0 | 0 | 0.081 |
| Example 1 | 90 | 0 | 10 | 0 | 0 | 0 | 0 | 0.031 |
| Example 2 | 90 | 0 | 0 | 10 | 0 | 0 | 0 | 0.040 |
| Example 3 | 80 | 0 | 0 | 20 | 0 | 0 | 0 | 0.026 |
| Example 4 | 70 | 0 | 0 | 30 | 0 | 0 | 0 | 0.023 |
| Example 5 | 70 | 0 | 30 | 0 | 0 | 0 | 0 | 0.023 |
| Example 6 | 50 | 0 | 10 | 0 | 10 | 30 | 0 | 0.006 |
| Example 7 | 75 | 0 | 10 | 0 | 5 | 10 | 0 | 0.008 |
| Example 8 | 75 | 0 | 5 | 0 | 10 | 10 | 0 | 0.009 |
| Example 9 | 70 | 0 | 10 | 0 | 10 | 10 | 0 | 0.007 |
| Example 10 | 70 | 0 | 10 | 0 | 10 | 0 | 10 | 0.022 |
| Example 11 | 80 | 0 | 10 | 0 | 10 | 0 | 0 | 0.010 |
| Example 12 | 80 | 0 | 10 | 0 | 0 | 10 | 0 | 0.009 |
| Example 13 | 0 | 80 | 10 | 0 | 10 | 0 | 0 | 0.010 |
| Example 14 | 0 | 70 | 10 | 0 | 10 | 10 | 0 | 0.007 |
| Example 15 | 0 | 70 | 10 | 0 | 10 | 0 | 10 | 0.021 |

As shown in Table 1, articles fabricated by forming a polymeric composition including a polymer and an inorganic moisture absorbent dispersed therein according to an embodiment (Examples 1 and 2) show a greater than or equal to 1/10-reduced water vapor transmission rate compared with that of articles molded by respectively using the polymer alone (Comparative Examples 1 and 2), and in addition, at least greater than or equal to 1/5-reduced water vapor transmission rate compared with that of an article molded by adding a fluorinated resin to the polymer (Comparative Example 3).

Further, an article molded by adding either graphite or a fluorinated resin to a base polymer and an inorganic moisture absorbent show a more reduced water vapor transmission rate, that is, greater than or equal to 1/5-reduced water vapor transmission rate compared with that of an article including the base polymer, as well as an inorganic moisture absorbent alone. In addition, when an article further includes graphite, if the article includes expanded graphite having an aspect ratio of greater than or equal to 100, the article shows a much reduced water vapor transmission rate (refer to Example 12 and the like). However, if the article includes general graphite having an aspect ratio of 50 along with a fluorinated resin and the like (Examples 10 and 15), it has about two times increased water vapor transmission rate compared with that of the article including a fluorinated resin alone (Example 11). In other words, graphite may play a role in hindering a moisture-moving path and reducing a water vapor transmission rate, and especially, as the aspect ratio is larger, the effect of reducing a water vapor transmission rate is larger.

and accordingly, an excellent effect in terms of impact strength of a battery case may be expected.

As aforementioned, a battery case formed of an article obtained by molding a polymeric composition including a base polymer and an inorganic moisture absorbent dispersed therein according to an embodiment has excellent moisture transmission resistivity and may be easily fabricated to have a desired size and a desired shape, and advantageously may be used to fabricate a battery module and the like as an energy source of a device, such as an electric vehicle, and the like, supplied with electric power from a plurality of electrochemical device.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A battery comprising:
   a battery case comprising a container housing an electrode assembly, wherein
   the container comprises a bottom wall and a plurality of side walls,
   the bottom wall and the plurality of side walls are integrated to define a space for housing the electrode assembly and to define a top opening opposite the bottom wall, the container comprises a polymeric composition, and
the battery case has a water vapor transmission rate of less than about 0.023 grams per square meter per day, when measured at 38° C. and a relative humidity of 100% according to ISO 15106 or ASTM F1249, and
wherein the polymeric composition comprises:
   a polymer, wherein the polymer comprises a polyolefin or a liquid crystal polymer,
   an inorganic moisture absorbent dispersed in the polymer in an amount of 5 weight percent to 10 weight percent based on a total weight of the polymeric composition, wherein the inorganic moisture absorbent comprises calcium oxide, a zeolite, or a combination thereof, and
   a fluorinated resin in an amount of 5 weight percent to 10 weight percent based on the total weight of the polymeric composition, or
   a combination of the fluorinated resin in the amount of 5 weight percent to 10 weight percent based on the total weight of the polymeric composition and graphite in an amount of 10 weight percent to 30 weight percent based on the total weight of the polymeric composition.

2. The battery of claim 1, wherein the container comprises a partition wall extending from a first side wall to an opposite second side wall.

3. The battery of claim 1, wherein the battery case further comprises a lid configured to close at least a part of the top opening of the container, and wherein the lid comprises at least one of a positive terminal and a negative terminal.

4. The battery of claim 3, wherein the lid comprises the polymeric composition.

5. The battery of claim 1, wherein the polymer comprises a polyolefin.

6. The battery of claim 5, wherein the polyolefin comprises a high density polyethylene.

7. The battery of claim 1, wherein the liquid crystal polymer comprises a structural unit derived from an oligomer of hydroxybenzoic acid.

8. The battery of claim 1, wherein the fluorinated resin comprises polytetrafluoroethylene, polyvinylidene fluoride, polychlorotrifluoroethylene, a mixture thereof, or a copolymer thereof.

9. The battery of claim 1, wherein the polymeric composition comprises the fluorinated resin in the amount of 5 weight percent to 10 weight percent based on the total weight of the polymeric composition and the graphite in the amount of 10 weight percent to 30 weight percent based on the total weight of the polymeric composition.

10. The battery of claim 1, wherein the inorganic moisture absorbent comprises CaO.

11. The battery of claim 1, wherein the polymeric composition further comprises a moisture barrier material selected from a crystalline polymer, an inorganic material different from the inorganic moisture absorbent, or a fiber-shaped material.

12. The battery of claim 11, wherein the moisture barrier material comprises wollastonite, mica, barium sulfate, kaolin, talc, nanoclay, a carbon fiber, a glass fiber, a whisker of graphite, alumina, iron, silicon carbide, or silicon, or a combination thereof.

13. The battery of claim 1, wherein:
   the electrode assembly comprises a positive electrode and a negative electrode case.

14. The battery of claim 13, wherein the electrode assembly does not include a metal exterior material.

15. The battery of claim 13, wherein the electrode assembly is an electrode assembly for a rechargeable lithium battery.

16. The battery of claim 1, wherein the polymeric composition comprises the fluorinated resin in the amount of 5 weight percent to 10 weight percent based on the total weight of the polymeric composition.

17. The battery of claim 1, wherein an aspect ratio of the graphite is greater than or equal to about 100.

18. A method of fabricating a battery, the method comprising:
   molding a polymeric composition to prepare a battery case including a container configured to house an electrode assembly comprising a positive electrode and a negative electrode, wherein the battery case has a water vapor transmission rate of less than about 0.023 grams per square meter per day, when measured at 38° C. and a relative humidity of 100% according to ISO 15106 or ASTM F1249,
   disposing the electrode assembly comprising the positive electrode and the negative electrode in the container of the battery case, and
   injecting an electrolyte solution in the container housing the electrode assembly,
   wherein the polymeric composition comprises:
      a polymer, wherein the polymer comprises a polyolefin or a liquid crystal polymer,
      an inorganic moisture absorbent dispersed in the polymer in an amount of 5 weight percent to 10 weight percent based on a total weight of the polymeric composition, wherein the inorganic moisture absorbent comprises calcium oxide, a zeolite, or a combination thereof,
      a fluorinated resin in an amount of 5 weight percent to 10 weight percent based on the total weight of the polymeric composition, or
      a combination of the fluorinated resin in the amount of 5 weight percent to 10 weight percent based on the total weight of the polymeric composition and graphite in an amount of 10 weight percent to 30 weight percent based on the total weight of the polymeric composition.

* * * * *